RADIO RECEIVER VOLUME CONTROL UTILIZING HALL EFFECT UNIT

Filed May 19, 1967

INVENTOR.
William T. Lemen
BY
Robert E. Fowler
ATTORNEY

United States Patent Office 3,509,466

Patented Apr. 28, 1970

3,509,466

RADIO RECEIVER VOLUME CONTROL UTILIZING HALL EFFECT UNIT

William T. Lemen, Frankfurt, Ind., assignor to General Motors Corporation, Detroit, Mich., a corporation of Delaware

Filed May 19, 1967, Ser. No. 639,722
Int. Cl. H01c *7/16;* H01p *1/22*
U.S. Cl. 325—397 1 Claim

ABSTRACT OF THE DISCLOSURE

A volume control device for a radio receiver which utilizes a movable Hall effect member which is passed through a magnetic field to change the output for varying the volume of a radio receiver.

DESCRIPTION OF THE INVENTION

One of the most used and also one of the highest service items on a radio receiver is the volume control. Traditionally that has been a coil of resistance wire over which an arm moved to cut in and out certain amounts of resistance in the audio circuit depending upon the desired output. The friction between the metallic conductive arm and the exposed face of the resistance wire wore the wire and was also subject to oxidation corrosion and poor contact after a period of use. After usage the movement of the arm begins to create a scratchy sound in the output at the speaker. These units are one of the highest replacement items in servicing radio receivers.

The present construction provides a variation in receiver output by relative motion between parts that do not physically engage each other but provide an interaction of a part with a magnetic field. There is no mechanical wear of parts and should require no service from this standpoint. Such devices are known by the generic term of Hall effect devices. The particular novelty here is involved in the use of a Hall effect device in an audio amplifier to control the volume of the receiver. While Taylor et al. 3,066,-187 discloses the use of a Hall effect device in a stereo system to balance the output of one stereo signal with that of the other, this is quite different from that of the present disclosure.

Figure 1:
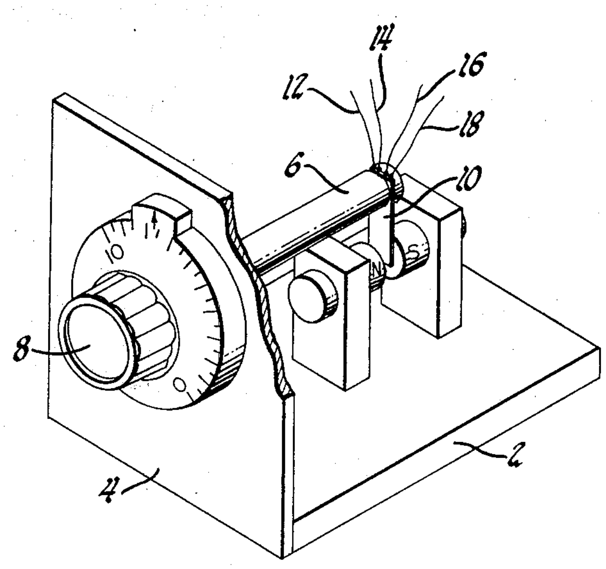
Figure 2:
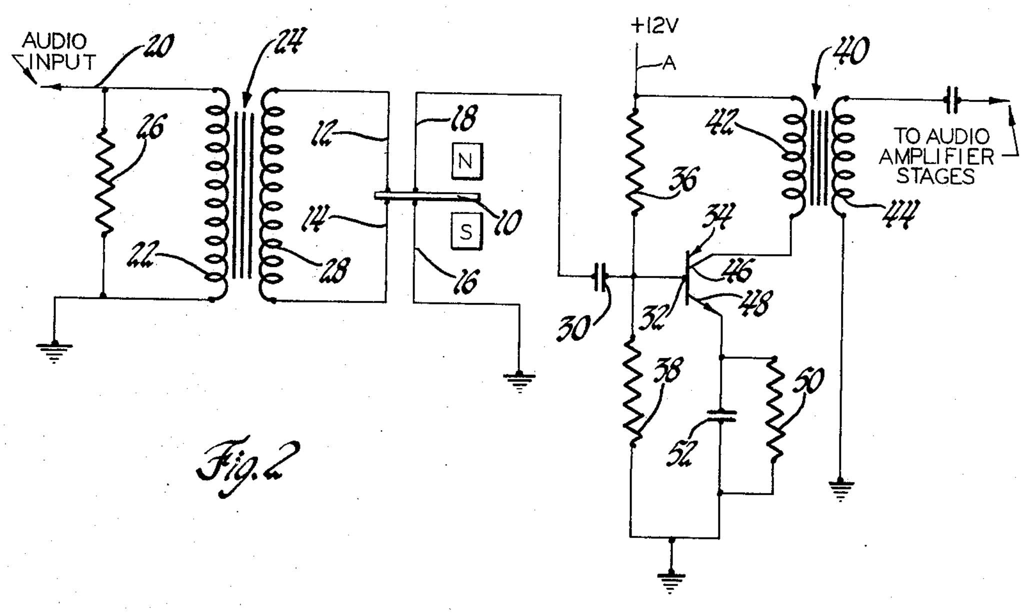

The present drawings disclose in:

FIGURE 1 a perspective view of a control device per se embodying the invention, and in FIGURE 2, a circuit diagram of an audio output circuit including said control device.

A Hall effect device is based on the principle that if a magnetic field is applied to a current carrying conductor, electrons in the conductor are deflected in a direction perpendicular to both the field and current flow. This crowds the electrons to one side of the conductor in such a device and causes an electric field to be established which opposes the force of the magnetic field. By applying contacts to the sides of the conductor it is possible to utilize the Hall voltage.

The relationship between the voltages and the dimensions of the conductive body may be set forth in the following formula.

$$\frac{V_H}{V_L}=\frac{B}{10^8}\mu\frac{W}{L}$$

where $V_H$=Hall effect or output voltage
$V_L$=Applied or input voltage
B=Magnetic flux strength
$\mu$=Conductivity of body material
W=Width of body
L=Length of body The present construction utilizes a small slab of conductive material with contacts soldered to each of the four edges, two serving as input electrodes and two as output. The voltage present at the output is proportional to both the input voltage and the magnetic field strength perpendicular to the plane of the contacts.

An illustrative example of one such form of a device is shown in FIGURE 1 although it may take other physical forms as well. In that figure there is shown a base 2, which may be the chassis of a radio receiver, which supports a front panel 4. A control shaft 6 is rotatably mounted through the front panel 4 and supoprted thereby. A graduated control knob 8 is secured to the outer end and a long rectangular Hall effect device 10 is supported by one of its ends on the inner extremity of the shaft 6. The contacts, although they are actually on each of four opposite sides, are not specifically shown but leads therefrom are brought to terminals 12, 14, 16 and 18 extending from one end.

In the operation of this volume control, the knob 8 is grasped and turned to turn shaft 6. This moves the slab or unit 10 from a position as shown located between the N and S poles and therefore subject to a maximum strength of the magnetic field to any position away from that until when it is straight up and there will be practically no magnetic field effect. As the knob is turned, the ratio of output to input will vary from maximum to zero. In making such a device as shown at 10, a slab is cut and contacts are soldered to each of four longitudinal edges, two opposite serving as a pair of input contacts and two a pair of output electrodes. The voltage present at the output is proportional to the input voltage and to the strength of the magnetic field perpendicular to the plane of the contacts.

In the electrical circuit the conventional volume control for a radio receiver is replaced by a fixed resistance across which a maximum signal voltage is developed. A circuit illustrative of this is shown in FIGURE 2. The output of the detection portion of the radio receiver is connected to line 20. Primary winding 22 of audio transformer 24 is connected across line 20 and ground and resistor 26 is connected in shunt to said primary 22. The full audio signal voltage is developed across the resistor 26 and applied to the transformer input. The secondary winding 28 of the transformer has its terminals connected to the input leads 12 and 14 of the Hall effect unit 10. One of the output leads 16 is directly connected to ground. The other output electrode 18 is connected through coupling condenser 30 to the base electrode 32 of the transistor 34.

A source of electrical power indicated as +12 v. is connected to point A. Two resistors 36 and 38 in series extend between point A and ground and form a voltage divider. The midpoint of the divider is connected to the base 32 of transistor 34 acting as a buffer. A second audio frequency transformer 40 has a primary winding 42 and a secondary winding 44. The primary winding 42 is connected to the power source at point A and to the collector 46 of the transistor 34. The secondary winding 44 feeds the audio amplifier stages following. The emitter electrode 48 of the transistor is connected to ground through biasing resistance 50 in shunt with condenser 52.

If the radio receiver is in operation and is tuned to a particualr station, then the maximum output signal is developed across the resistance 26 and this voltage is equal to that across the primary winding 22. Assuming first that at the same time the shaft 6 is so set that the member 10 is directed oppositely away from the position shown in FIGURE 1 or straight up, there will be little or no magnetic field effect thereon, and therefore there will be substantially no signal transferred through the device. The volume output from transformer 40 will be zero or off. As the knob 8 is rotated to bring the member 10 down into the magnetic field between the S and N poles to be affected thereby, the signal will rise until at a position when the member 10 is directly between the poles the maximum magnetic field effect is present and maximum volume will be transmitted to the amplifier.

Through the use of such a device and the electrical connections, most of the service difficulties attendant the present rheostat friction type will be eliminated since all mechanical contact between moving parts has been removed and wear eliminated.

I claim:

1. In a radio receiver including a chassis structure, an audio detector stage for detecting audio frequency voltages, and an audio amplifier stage for amplifying audio frequency voltages; a volume control comprising: a Hall effect device including a conductive body having a pair of input electrodes and a pair of output electrodes arranged so that the magnitude of an output voltage developed across the output electrodes is a function of the magnitude of an input voltage applied across the input electrodes and the amount of magnetic flux incident upon the conductive body; magnetic flux generating means supported by the chassis structure including a pair of magnetic poles for producing a magnetic flux between the poles; Hall effect device mounting means supported by the chassis and including a manually rotatable control element connected with the Hall effect device for moving the conductive body between the magnetic poles as the control element is manually rotated thereby to vary the amount of flux incident upon the conductive body so as to correspondingly vary the magnitude of the output voltage developed across the output electrodes; a first audio frequency transformer having a primary winding and a secondary winding, the primary winding connected across the detector stage for receiving a detected audio frequency voltage, the secondary winding connected across the input electrodes of the Hall effect device for applying the detected audio frequency voltage as an input voltage to the Hall effect device so that the output voltage of the Hall effect device is an audio frequency voltage having a magnitude determined by the amount of magnetic flux incident upon the conductive body of the Hall effect device; a transistor amplifier for receiving an input voltage across an input circuit and for providing an amplified output voltage across an output circuit, the input circuit connected across the output elecrodes of the Hall effect device for receiving the audio frequency output voltage of the Hall effect device as an input voltage to the transistor amplifier so that the output voltage of the transistor amplifier is an amplified audio frequency voltage; a second audio frequency transformer having a primary winding and a secondary winding, the primary winding connected across the output circuit of the transistor amplifier for receiving the amplified audio frequency voltage, the secondary winding connected across the audio amplifier stage for applying the amplified audio frequency voltage to the audio amplifier stage; whereby the magnitude of the audio frequency voltage transferred between the audio detector stage and the audio amplifier stage is regulated by manually rotating the control element thereby to regulate the volume of the audio radio receiver.

References Cited

UNITED STATES PATENTS

| | | | |
|---|---|---|---|
| 2,037,753 | 4/1936 | Barton | 325—397 X |
| 2,894,234 | 7/1959 | Weiss et al. | 338—32 |
| 3,112,464 | 11/1963 | Ratajski et al. | 338—32 |
| 3,187,254 | 6/1965 | Wasserman. | |
| 3,267,404 | 8/1966 | Hieronymus | 338—32 |

ROBERT L. GRIFFIN, Primary Examiner

B. V. SAFOUREK, Assistant Examiner

U.S. Cl. X.R.

338—32